United States Patent
Kim et al.

(10) Patent No.: US 10,377,105 B2
(45) Date of Patent: Aug. 13, 2019

(54) PROTECTIVE GLASS FILM

(71) Applicant: Han Jin Printing & Chemical Co., Ltd., Seoul (KR)

(72) Inventors: Young Taek Kim, Chungcheongnam-do (KR); Nam Tae Kim, Chungcheongnam-do (KR); Seok Bong Lyu, Chungcheongnam-do (KR); Ki Woong Choi, Chungcheongnam-do (KR)

(73) Assignee: Han Jin Printing & Chemical Co., Ltd., Seoul (KR)

( * ) Notice: Subject to any disclaimer, the term of this patent is extended or adjusted under 35 U.S.C. 154(b) by 739 days.

(21) Appl. No.: 14/427,198

(22) PCT Filed: Apr. 16, 2013

(86) PCT No.: PCT/KR2013/003179
§ 371 (c)(1),
(2) Date: Mar. 10, 2015

(87) PCT Pub. No.: WO2014/038769
PCT Pub. Date: Mar. 13, 2014

(65) Prior Publication Data
US 2015/0224740 A1    Aug. 13, 2015

(30) Foreign Application Priority Data

Sep. 10, 2012  (KR) .................. 10-2012-0099745

(51) Int. Cl.
*B32B 5/16*     (2006.01)
*B32B 27/08*    (2006.01)
(Continued)

(52) U.S. Cl.
CPC ................. *B32B 5/16* (2013.01); *B32B 27/08* (2013.01); *B32B 27/14* (2013.01); *B32B 27/32* (2013.01);
(Continued)

(58) Field of Classification Search
CPC  B32B 5/16; B32B 27/08; B32B 27/14; B32B 27/32; B32B 2264/0257;
(Continued)

(56) References Cited

U.S. PATENT DOCUMENTS

2006/0246299 A1* 11/2006 Brady ................... C03C 17/007
                                                           428/426
2008/0248256 A1* 10/2008 Kim ..................... G02B 6/0036
                                                           428/172

(Continued)

FOREIGN PATENT DOCUMENTS

JP    11207882     3/1999
JP    2005309071   11/2005
(Continued)

OTHER PUBLICATIONS

International Search Report dated Jul. 4, 2013 received for PCT Application No. PCT/KR2013003179.

*Primary Examiner* — Frank J Vineis
*Assistant Examiner* — Michael Zhang
(74) *Attorney, Agent, or Firm* — Fleit Gibbons Gutman Bongini Bianco PL; Jose Gutman

(57) ABSTRACT

A glass protective film includes a base film formed by melting a weak adhesive polymer to be adhered to a glass plate by weak adhesion; a first surface of the base film prepared into a weak adhesive surface, which is a mirror surface; and a second surface thereof prepared into a non-adhesive surface which is a rough bead surface. Beads for preparing the rough bead surface are hexagonal, rectangular (Continued)

or triangular beads or ball beads prepared by cutting a film; and the ceiling reach rate of the beads of the rough bead surface is 30% or more.

4 Claims, 20 Drawing Sheets

(51) Int. Cl.
    *B32B 27/14*     (2006.01)
    *B32B 27/32*     (2006.01)
    *C09J 7/10*     (2018.01)
    *C08K 7/16*     (2006.01)
    *G02F 1/1333*     (2006.01)

(52) U.S. Cl.
    CPC ............. *C09J 7/10* (2018.01); *B32B 2250/02* (2013.01); *B32B 2250/242* (2013.01); *B32B 2264/0257* (2013.01); *C08K 7/16* (2013.01); *C08K 2201/013* (2013.01); *C09J 2201/32* (2013.01); *C09J 2203/318* (2013.01); *G02F 2001/133302* (2013.01); *Y10T 428/24372* (2015.01); *Y10T 428/24405* (2015.01)

(58) Field of Classification Search
    CPC .. B32B 2250/242; B32B 2250/02; C09J 7/00; C09J 2201/32; C09J 2203/318; Y10T 428/24405; Y10T 428/24372; G02F 2001/133302; C08K 2201/013; C08K 7/16

See application file for complete search history.

(56) References Cited

U.S. PATENT DOCUMENTS

| | | | | |
|---|---|---|---|---|
| 2011/0236653 A1* | 9/2011 | Hayashi | ............ | C08G 18/6229 428/206 |
| 2012/0141732 A1* | 6/2012 | Patel | ................ | B32B 33/00 428/141 |

FOREIGN PATENT DOCUMENTS

| | | | | |
|---|---|---|---|---|
| JP | 5053371 B2 * | 10/2012 | ............ | B29C 70/64 |
| KR | 1020050012568 | 2/2005 | | |
| KR | 1020050034534 | 4/2005 | | |
| KR | 100776197 | 11/2007 | | |
| KR | 1020090018713 | 2/2009 | | |
| WO | WO-2007148849 A1 * | 12/2007 | ............ | B29C 70/64 |
| WO | WO-2009158036 A2 * | 12/2009 | ............ | B32B 33/00 |

\* cited by examiner

PROTECTIVE GLASS FILM

BACKGROUND

The present invention relates to a glass protective film, and, more particularly, to a glass protective film for use in a glass plate for manufacturing a liquid crystal display (LCD).

An LCD glass plate is adapted to have a cleanliness grade for thin film transistor processing. The LCD glass plate includes a glass protective film to maintain high cleanliness in the course of transporting such glass plates to a transistor processing location from a production location. If the non-adhesive performance of the second surface of the glass protective film is poor, the glass protective film has to be used together with an insert paper when the glass plate is introduced to LCD processes.

When the glass protective film is used together with the insert paper in this way, fine scratches are made on the surface of the glass plate by the insert paper, and thus quality of the glass plate may deteriorate, and also, impurities are attached to the glass plate from the insert paper. Ultimately, the glass plates having the insert papers therebetween should be cleaned before a transistor process is performed. When a cleanser is used, cleaner residues may be left behind on the surface of the glass plates.

Compared to glass plates using only an insert paper, LCD glass plates using the glass protective film attached to the surface thereof and the insert paper interposed between the glass plate and the protective film have fewer scratches on the surface thereof. When stacked glass plates are separately transported one by one under the condition that the glass protective film having poor non-adhesive performance is used and the insert paper is not used, the back glass plate may be transported with being attached to the front glass plate, and thus the number of glass plates which are broken during transport may increase. The use of the glass protective film together with the insert paper may increase the number of processes and the insert paper cost, and also dust of the paper is liable to decrease cleanliness of the LCD glass plate.

Even when slim LCD glass having a large LCD screen with a thickness of about 1 mm is carefully handled by two persons, the glass may be easily broken and thus makes it difficult to handle.

Conventional techniques for manufacturing LCD glass protective films include U.S. Pat. Nos. 5,100,709, 6,040,046, 6,387,481B1, 4,895,760, and 6,326,081B1. These patent products include a glass protective film and an insert paper. Hence, there is a need to develop a glass protective film having no insert paper. The first surface of the glass protective film having no insert paper, has to have weak adhesion to the glass plate, and the second surface thereof has to exhibit non-adhesiveness so that films or the film and the glass plate do not stick together.

Korean Patent No. 10-0776197 discloses a glass protective film having a first surface with weak adhesion to the glass plate and a second surface having no adhesion to the glass plate. The formation of the rough surface having no adhesion to the glass plate may obviate the use of the insert paper. The non-adhesiveness which enables the omission of the insert paper should be adapted to safely separately transport superimposed glass plates one by one in the proper transport speed range.

However, the aforementioned film having a rough bead surface that is able to omit the use of the insert paper is a film including a polymer powder (microbeads) attached to the second surface thereof. In the course of preparation of a polymer powder by a disk mill, the yield of normal microbeads may decrease, thus lowering economic efficiency. Furthermore, the shape of normal microbeads is irregular, and the microbeads may include cracks and removable tail or lump portions, undesirably increasing defect rates in LCD processes.

As disclosed in Korean Patent No. 10-0776197, the glass protective film having no insert paper includes a base film having a first surface with weak adhesion to the glass plate and a second surface that is a rough bead surface. The glass protective film is provided in the form of a thin film so as to facilitate the post treatment including recovery after use of the protective film. The rough bead surface is formed in such a manner that a polymer is melted by an extruder and then formed into a film, and microbeads are dropped to an appropriate density on a rotating cooling rubber roll and then attached to the second surface of the formed film without changing the distributed state thereof while the film is cooled and cured by a cooling rubber roll.

To manufacture microbeads for the rough bead surface as the second surface of the glass protective film, a low-density resin (LDPE) is prepared and pulverized by a disk mill. As illustrated in FIG. 7, the pulverized low-density resin powder has an irregular particle shape or size. To obtain the preferable normal microbeads, the microbeads are sieved using a 40-mesh screen and a 50-mesh screen, thus sorting the polymer particles having a particle size of 500~600 μm.

When microbeads in the wide particle size range of 50~500 μm are used to manufacture the glass protective film, the preparation yield of microbeads by a disk mill may increase but a height variation of the beads attached to the base film may increase, and thus, as illustrated in FIG. 3, the ceiling reach rate of the microbeads may be remarkably lowered to 15~20%, undesirably significantly deteriorating the non-adhesive performance of the glass protective film. Further, even when the low-density polymer pulverized by a disk mill is sorted to a particle size of 450~550 μm, it is difficult to completely separate fine particles and thus limitations are imposed on improving the ceiling reach rate of the beads of the rough bead surface of the glass protective film.

BRIEF SUMMARY

With the goal of resolving such problems as discussed herein, there has been devised the use of regular microbeads obtained by cutting a polymer film having a predetermined thickness into a predetermined shape and size.

An embodiment of the present invention addresses an improved LCD glass protective film. The LCD glass protective film has a first surface which is a weak adhesive surface (a surface having weak adhesion), and a second surface which is a non-adhesive surface (a surface having no adhesion) as a rough bead surface (a rough surface formed of beads). The weak adhesive surface of the glass protective film is attached to a glass plate. The non-adhesive surface which is the second surface of the film is a rough bead surface having excellent non-adhesiveness, thus obviating the need for an insert paper when stacking LCD glass plates.

In order to solve such problems as have been discussed above, methods of regularly controlling the particle shape and size of the microbeads have been proposed in this disclosure. Thereby, it is expected to increase the yield of normal microbeads, improve the non-adhesive properties of the glass protective film, and decrease the defect rates in LCD processes.

Accordingly, the present invention is intended to provide a glass protective film having no insert paper, which includes a base film having a first surface that is a weak adhesive surface attached by weak adhesion to a glass plate and a second surface that is a rough bead surface with non-adhesiveness to the glass plate or film. This invention is intended to provide a glass protective film wherein the rough bead surface as the second surface of a base film is improved. This invention is intended to provide a glass protective film, wherein the shape and size of polymer microbeads are regularly controlled and thus the ceiling reach rate of the beads adhered to the film may increase, thus enhancing non-adhesiveness. This invention is intended to provide a glass protective film, wherein cut microbeads are used, thus excluding problems with pulverized microbeads where cracks or removable lump portions may be incorporated, thereby reducing the generation of defects in LCD processes. This invention is intended to provide a glass protective film, wherein the yield of normal microbeads may increase, thus reducing the bead preparation cost. This invention is intended to provide a glass protective film, wherein a polymer film is cut to thus prepare cut microbeads. This invention is intended to provide a glass protective film, wherein cut microbeads such as hexagonal beads, rectangular beads or triangular beads may be attached to the film to form a rough bead surface. This invention is intended to provide a glass protective film, wherein polymer micro ball beads may be attached to the film to thus form a rough bead surface.

When a film having a predetermined thickness is cut by a cutter, cut regular microbeads with a preferable bead size may be manufactured, thus increasing the yield of normal beads and decreasing a size variation of the beads, thereby remarkably increasing the ceiling reach rate of the beads of the rough bead surface of the glass protective film, ultimately significantly enhancing the non-adhesive performance of the glass protective film, and reducing the generation of defects in LCD processes due to no fine particle contamination in the glass protective film.

The film for the cut microbeads is a polymer film having a thickness of 150~550 μm. The low-density film for the cut microbeads is a low-density polyethylene-based polymer film; a polyolefin-based polymer film; an olefin-based monomer film such as EVA, EAA or EMMA; a copolymer film having a polar monomer; a polyolefin-based rubber film; and other rubber films.

The high-density polymer film for the microbeads may include a polyethylene film, a polypropylene film, a polymethacrylate film, a polystyrene (PS) film, an acrylonitrile-butadiene-styrene (ABS) copolymer film, a HIPS (High Impact Polystyrene) film; a copolymer film containing a styrene monomer, a polyester film, a polyester elastomer film, a nylon elastomer film, a polyester-based polymer film; and a nylon-based polymer film.

The shape of the cut regular microbeads is not particularly limited, but is preferably set in terms of facilitating the construction of a cutter for cutting a two-dimensional planar film without leaving the film debris behind. Examples of the microbeads which facilitate the construction of a cutter without leaving the film debris behind may include, but are not limited to, hexagonal beads, rectangular beads and triangular beads.

If there is no need to consider economic efficiency, ball beads like the cut microbeads may be attached to the non-adhesive surface that is the second surface of the glass protective film to form a rough bead surface.

The ball beads may be manufactured by melting polymer units based on a weight of ball to prepare polymer particles, applying surface tension to the polymer particles to form spherical ball beads, or by cutting a cured polymer into particles and grinding the cut particles.

The cut microbeads are dropped on the formed base film and then adhered. Specifically, a weak adhesive polymer is melted by an extruder, and then formed into a film by a die. A pair of cooling rolls may include a cooling roll for forming a mirror surface which is the weak-adhesive surface on the first surface of the base film and a cooling rubber roll for transporting the microbeads to attach them to the second surface of the base film. Further, a bead feeder is disposed over the cooling rubber roll.

The regular microbeads, which are placed in the bead feeder, are cut beads, including but not limited to hexagonal beads, rectangular beads or triangular beads, or ball beads.

The cut microbeads or the ball beads may be dropped on the cooling rubber roll, and then transferred and adhered to the second surface of the film to be cooled without changing the distributed state thereof, giving a rough bead surface having a high ceiling reach rate of the beads.

In the glass protective film, almost all of the cut microbeads, such as hexagonal beads, rectangular beads or triangular beads, or ball beads, belong in the ceiling region.

The preparation of the cut microbeads may result in high yield of normal beads.

According to the present invention, a glass protective film includes polymer microbeads having a regular shape and size attached to the film, and the rough bead surface thereof has a high ceiling reach rate of the beads. Since the microbeads have a regular size and shape, cracks or lump portions can be prevented from being incorporated in the glass protective film having microbeads, thus reducing the generation of defects in LCD processes and increasing the yield of normal microbeads, thereby decreasing the bead preparation cost. The regular microbeads include, but are not limited to, hexagonal beads, rectangular beads and triangular beads, and ball beads, and the like.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DESCRIPTION OF THE REFERENCE NUMERALS IN THE DRAWINGS

Figure 1:
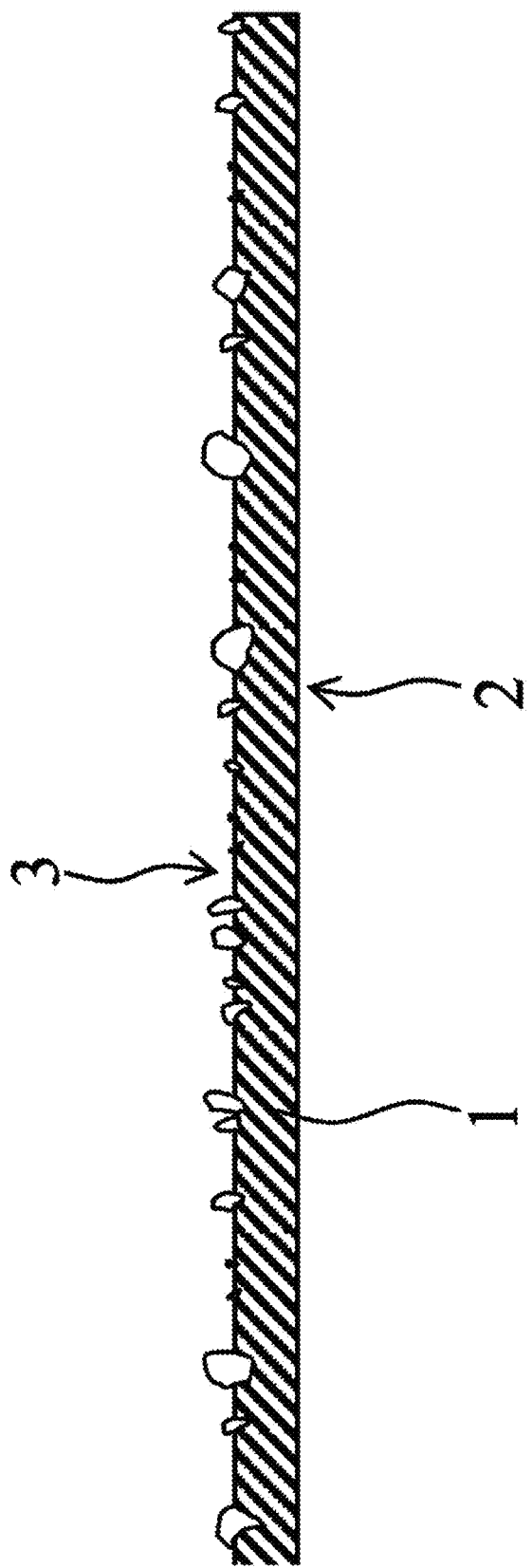
FIG. 1 is a cross-sectional view illustrating a conventional glass protective film.

11: base film, 12: weak adhesive surface, 13: rough bead surface, 1a: first layer, 10: glass protective film, 27: hexagonal bead, 37: rectangular bead, 47: triangular bead, 57: ball bead, 101: extruder, 102: die, 103: bead feeder, 104, 105: cooling roll, 11m: formed film, G: zone

DETAILED DESCRIPTION

As disclosed in Korean Patent No. 10-0776197 excluding the use of an insert paper, U.S. Pat. No. 6,326,081 and CN Patent No. 101472981B, a glass protective film is configured such that the first surface of a base film has weak adhesion to a glass plate and the second surface thereof is a rough bead surface having no adhesion to a glass plate or a film.

The glass protective film includes a coating adhesive film and a self-adhesive film depending on the extent of adhesion of the weak adhesive surface that is the first surface thereof. The coating adhesive film is configured such that an adhesive layer is applied on the surface coming into close contact with a glass plate, and an adhesive residue may be left behind on the surface of the glass plate after removal of the protective film from the glass plate. The adhesive residue which is left behind on the surface of the glass plate may have a negative influence on processes for manufacturing an LCD panel. The self-adhesive film is configured such that it is adhered by means of inherent adhesion of the base polymer therefor, instead of applying an additional adhesive layer on the surface coming into close contact with a glass plate. The polymer for the self-adhesive base film may include a low-density polyethylene-based polymer; a polyolefin-based polymer; an olefin-based monomer such as EVA, EAA or EMMA; a copolymer having a polar monomer; a polyolefin-based rubber; and other rubber materials.

When a base film is manufactured by increasing the adhesive strength of the first surface coming into close contact with the glass plate, the amount of the adhesive residue which is left behind on the glass plate may increase with an enhancement in adhesion. To minimize the amount of the residue on the glass plate, a base film is manufactured using a polymer having weak adhesion, and the close contact surface is formed into a mirror surface, thus enhancing adhesion to the glass plate. This film may decrease peel strength while increasing a close contact force to the glass plate.

In order to facilitate the post treatment including recovery after use of the glass protective film, in a suction duct in LCD processes, the second surface of the thin film having weak adhesion is made into a rough bead surface.

To manufacture a film having a rough bead surface, a weak adhesive polymer is melted and then formed into a base film, after which microbeads are distributed and adhered to the second surface of the film while cooling and curing the film, so that the second surface of the film is formed into the rough bead surface. The base film for forming the rough bead surface may be a single layer film, a two-layer film or a three-layer film.

Figure 2:
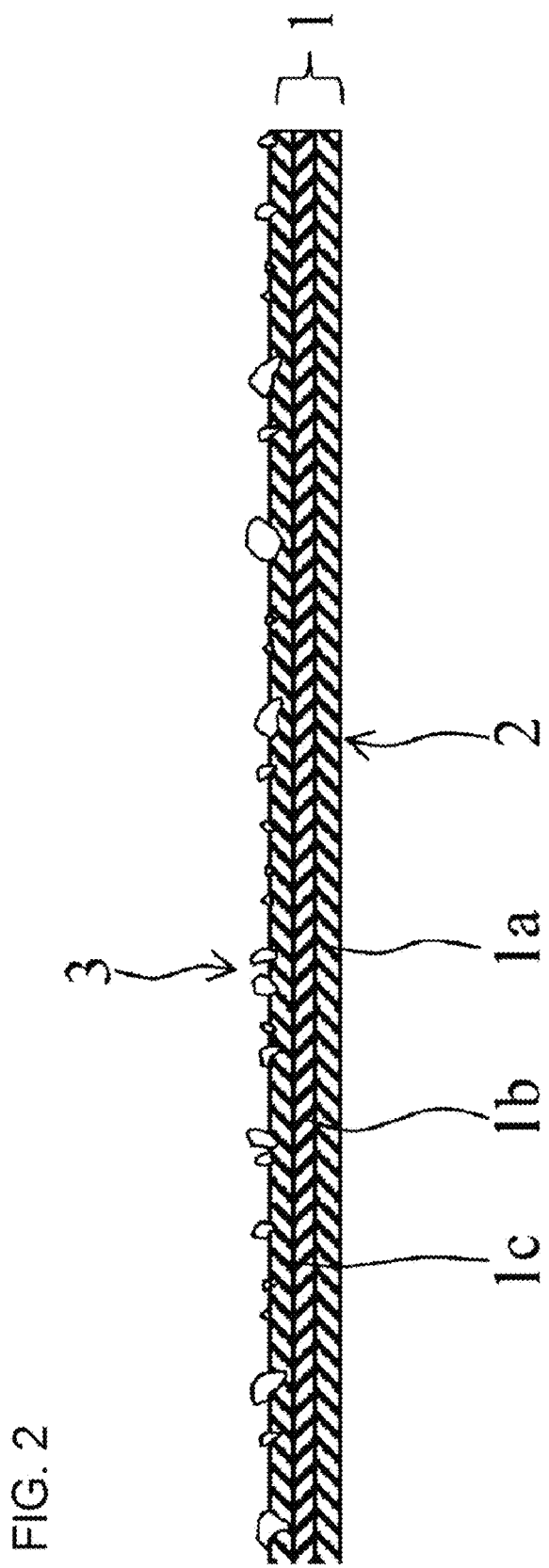
FIG. 2 is a cross-sectional view illustrating another conventional glass protective film.

As illustrated in FIG. 1, a glass protective film 1 is formed with a weak adhesive polymer where the first surface is a weak adhesive surface 2 dominated by weak adhesion of the polymer. The second surface of the base film is a non-adhesive surface 3 to which the glass plate, because of the formation of the rough bead surface, does not stick. The glass protective film is mostly provided in the form of a single layer film, but a two-layer film or a three-layer film as illustrated in FIG. 2 may be utilized, as necessary. As seen in FIG. 2, the three-layer base film 1 is a composite film comprising a first layer 1a, a second layer 1b and a third layer 1c, which are superimposed and adhered.

Figure 3:
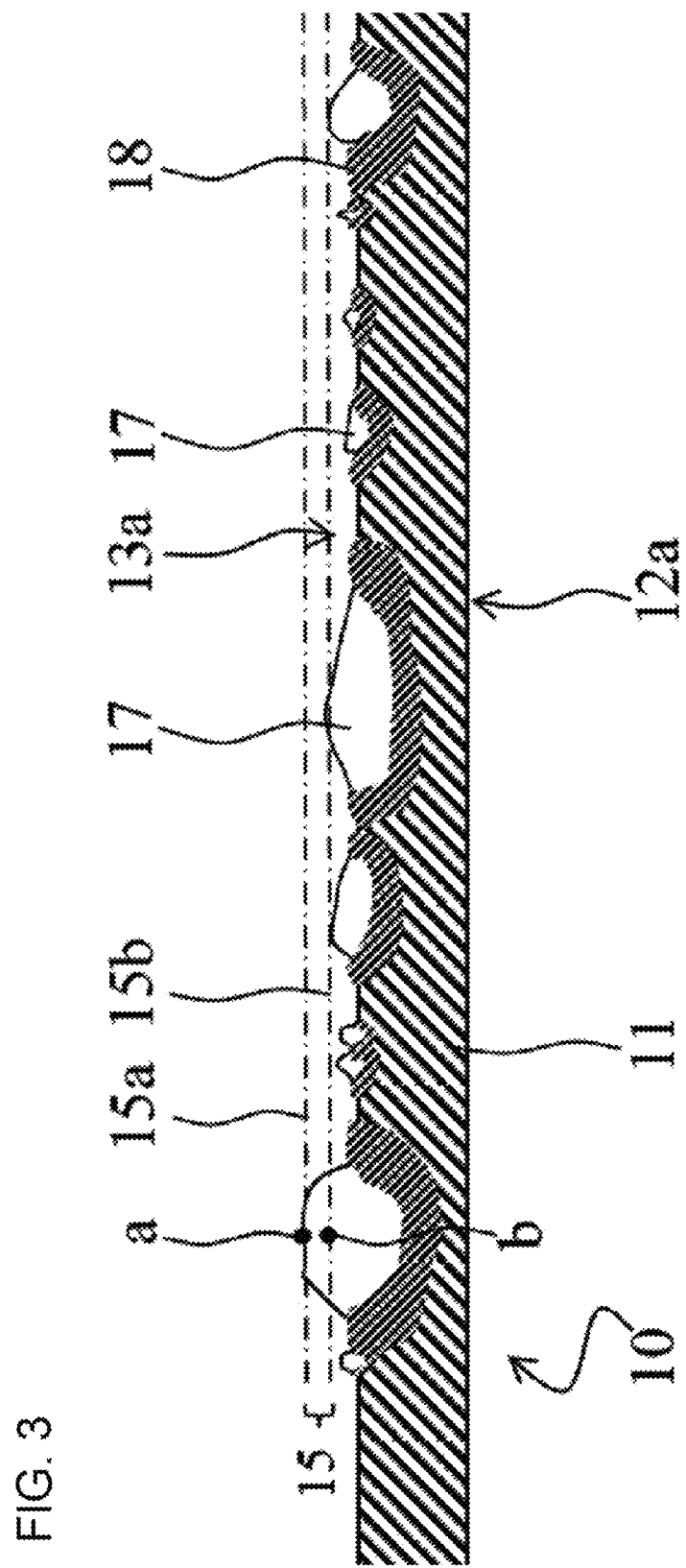
FIG. 3 is an enlarged cross-sectional view illustrating a glass protective film having pulverized microbeads attached thereto.

FIG. 3 is an enlarged view illustrating a glass protective film using microbeads pulverized by a disk mill. The glass protective film 10 is manufactured by melting a weak adhesive polymer to form a base film 11, and adhering, to the second surface of the base film 11, pulverized microbeads 17 which have been dropped and distributed on a cooling rubber roll, in the course of cooling the formed film. The glass protective film 10 is configured such that the first surface is a weak adhesive surface 12a dominated by weak adhesion of the polymer, and the second surface is a non-adhesive rough bead surface 13a. As illustrated in FIG. 3, the rough bead surface 13a is a rough bead surface having low ceiling reach rate of the beads having various sizes and shapes. Further, an adhesive portion 18 is formed between the microbeads 17 adhered to the base film 11 and the base film 11. The adhesive portion 18 is formed along the attachment interface between the base film 11 and the microbeads 17 while the heat of the melted polymer film is diffused to the microbeads 17 in the course of cooling the base film 11.

The microbeads are dropped onto the cooling rubber roll of the pair of cooling rolls from the bead feeder, and then transferred and attached to the second surface of the base film passing through the pair of cooling rolls. When the microbeads are dropped, a dropping distance is set between the rubber roll and the bead feeder. The dropping distance enables the microbeads to be uniformly distributed on the cooling rubber roll.

Figure 16:
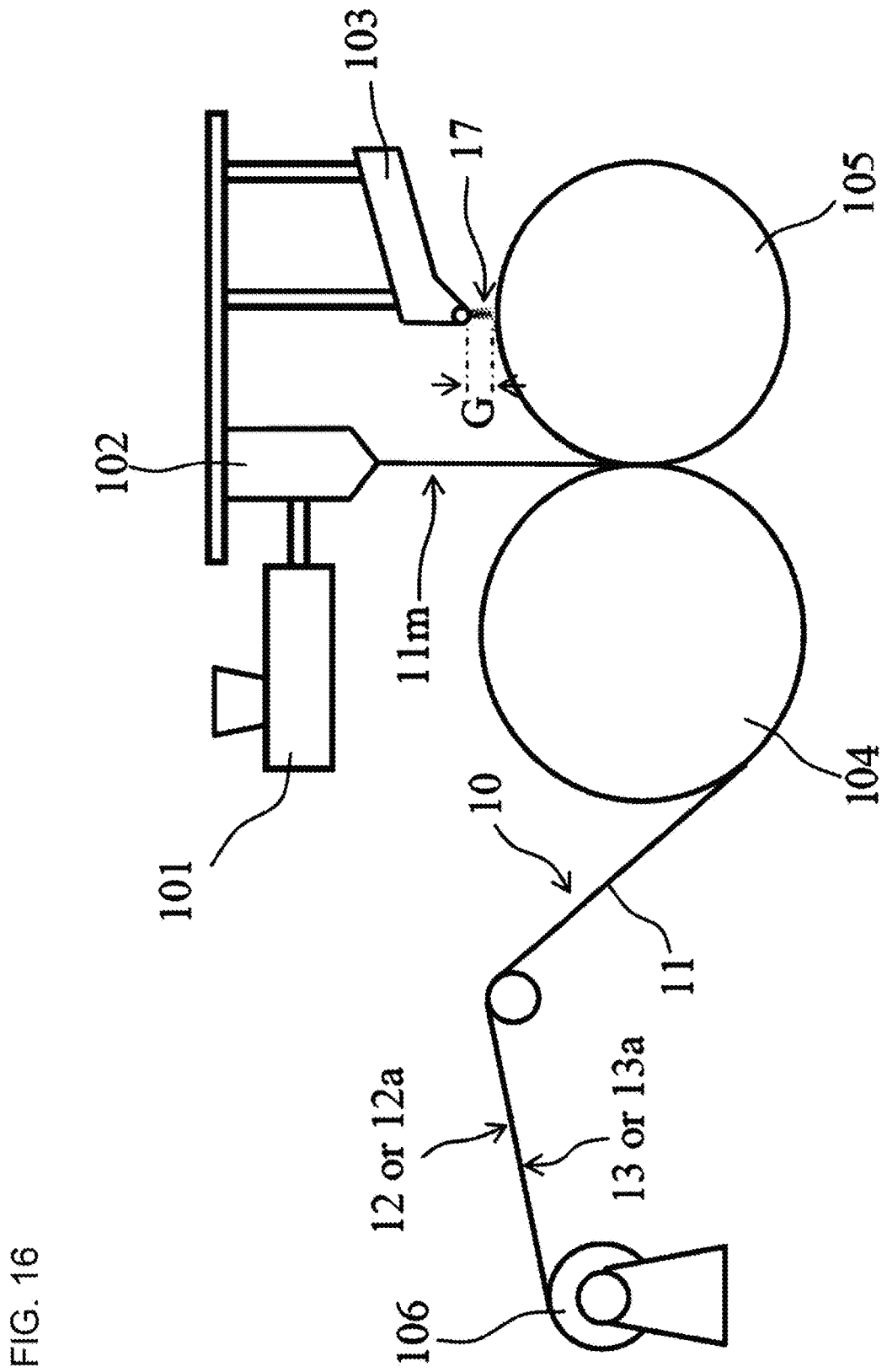
FIG. 16 is a schematic view illustrating an apparatus for forming a film including a device for adhering microbeads.

FIG. 16 illustrates an apparatus for manufacturing a film including the bead feeder. The weak adhesive polymer is melted by an extruder 101 and then formed into a film 11m by a die 102. The formed film is cooled and cured while passing through a pair of cooling rolls 104, 105 and then wound on a roll 106. In the apparatus for forming a film, a bead feeder 103 is disposed over the cooling rubber roll 105 and a dropping distance G is given between the bead feeder 103 and the cooling rubber roll 105. The dropping distance G enables the microbeads to be distributed while passing through air when they are seated onto the cooling rubber roll 105 from the bead feeder 103. The pair of cooling rolls may include the cooling roll 104 for forming a mirror surface that is the weak adhesive surface 12a on the first surface of the base film 11, and the cooling rubber roll 105 for transporting the microbeads so as to be attached to the second surface of the base film 11. As the cooling rolls 104, 105 rotate while cooling the formed film, the beads distributed and seated on the cooling rubber roll 105 are transferred without changing the distributed state thereof to the second surface of the film 11m to be cooled, and then are adhered to the second surface of the base film 11 during the cooling of the film, resulting in a rough bead surface 13a. When the base film formed of the weak adhesive polymer passes through the pair of cooling rolls in this way, the first surface of the base film 11 becomes a mirror surface that is the weak adhesive surface 12a and the second surface thereof becomes a rough bead surface 13a having distributed microbeads attached thereto.

The particle size of the microbeads may fall in the range of 1000 μm or less. When the microbeads are pulverized to a small size of 5 μm or less, the microbeads may be lost in the air in the dropping distance zone. Also even when the microbeads are as small as about 20 μm, a freefall time period may be retarded. If the particle size of the microbeads is excessively increased to 1000 μm or more, the microbeads may protrude to be too high from the surface of the thin base film and may thus be removed due to pressure between glass plates. The particle size of the microbeads is preferably set to 50~500 μm in view of the freefall speed of the microbeads and the separation speed of each of the glass plates in LCD processes.

The material for such microbeads may include an inorganic material including calcium carbonate or a polymer. However, the beads which are stably attached to the film to be cured may include polymer beads which may be strongly adhered to the polymer for the base film. In order to enhance adhesion efficiency between the microbeads and the protective film to be cured, the polymer for the microbeads has to have a melting temperature equal to or lower than that of the base film. However, in the adhering process for pressing and attaching microbeads to the protective film to be cured using the cooling rolls, adhesive affinity for adhering melted microbeads to the film is not essential. Even when the melting temperature of the polymer for the microbeads is higher than that of the base film, the microbeads may be stably attached to the surface of the film. Also, even when the polymer for the microbeads according to the present invention is a polymer having weak adhesion as in the base film, there is no problem in terms of non-adhesiveness depending on the rough bead surface.

The low-density polymer for use in the microbeads includes a low-density polyethylene-based polymer; a polyolefin-based polymer; an olefin-based monomer such as EVA, EAA or EMMA; a copolymer having a polar monomer; polyolefin-based rubber; and other rubber materials.

The high-density polymer for use in the microbeads may include polyethylene, polypropylene, polymethacrylate, polystyrene (PS), an acrylonitrile-butadiene-styrene (ABS) copolymer, HIPS (High Impact Polystyrene); a copolymer containing a styrene monomer, polyester, a polyester elastomer, a nylon elastomer, a polyester-based polymer; and a nylon-based polymer.

The amount of the microbeads distributed to be adhesive on the second surface of the base film is 0.1~7 $g/m^2$, and preferably about 3 $g/m^2$.

Such an LCD glass protective film has significantly contributed to the trend of increasing the size of an LCD substrate and to mass production thereof over the years. However, the demand for increasing the size of an LCD film requires more stringent quality of an LCD glass protective film, and price competitiveness in LCD markets needs to reduce the fabrication costs for glass protective films.

Although the second surface of the glass protective film thus manufactured is prepared into the rough bead surface to thus surely exhibit non-adhesiveness, there is a need for inexpensive glass protective films having high quality because of the large size of the LCD panel and the price competitiveness in markets as mentioned above.

Such a conventional film having a rough bead surface is illustrated in FIG. 3. In research into further enhancing non-adhesiveness of the film having a rough bead surface, the microbeads of the film having a rough bead surface as illustrated in FIG. 3 have a ceiling reach rate of less than 25%, which is evaluated to be very low. When the ceiling reach rate of the microbeads 17 distributed on the second surface of the base film 11 is low, non-adhesive performance of the film is not uniform, resulting in deteriorated non-adhesive properties of the glass protective film.

In the film having a rough bead surface, the ceiling reach rate of the microbeads is a factor showing the extent the microbeads attached to the film have reached the ceiling region 15.

As seen in FIG. 3, the ceiling region 15 for calculating the ceiling reach rate is defined as follows. In the sample area of the film 10 having a rough bead surface, the upper limit line 15a corresponding to the high point a of the microbeads 17 and the lower limit line 15b half the height from the second surface of the base film 11 to the high point a are set, and the internal region between the upper limit line 15a and the lower limit line 15b is defined as the ceiling region 15.

Method of Measuring Ceiling Reach Rate

To measure the ceiling reach rate of a glass protective film, the following items should be investigated: film thickness (noted item), a measurement region (e.g. a rectangular region with a width of 5 cm and a length of 5 cm), the ceiling region range a~b in the measurement region (high point a μm, low point b μm=a/2), the total number of measured beads BN, the number of beads reaching the ceiling region UBN, calculation of ceiling reach rate UN (UN=(UBN/BN) 100).

The ceiling reach rate of the film having a rough bead surface is represented as a percentage by counting the total number of beads in the sample area and counting the number of beads reaching the ceiling region (a~b) as mentioned above.

To evaluate the ceiling reach rate of the microbeads of the conventional film having a rough bead surface, a film sample having a rough bead surface comprising pulverized microbeads with a particle size of 50~500 μm is prepared. The ceiling reach rate of these microbeads is measured to be less than approximately 20%.

In the fabrication of microbeads for the rough bead surface as the second surface of the conventional glass protective film, a low-density resin (LDPE) is prepared, and then pulverized by a disk mill. The pulverized low-density resin powder has an irregular particle shape or size and thus is sieved using a 40-mesh screen and a 50-mesh screen, thus sorting polymer particles with a particle size of 500~600 μm as normal microbeads.

Figure 4:
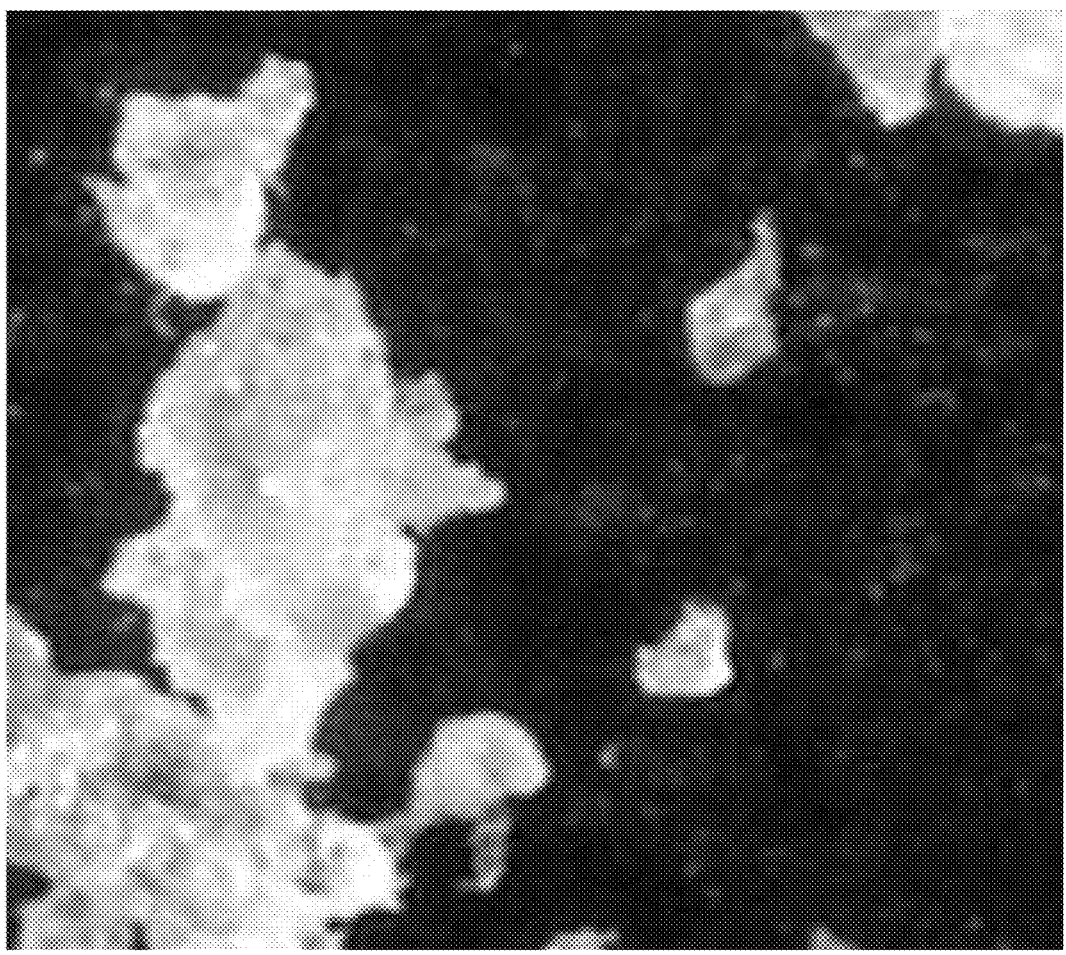
FIG. 4 is a micrograph illustrating a polymer pulverized by a disk mill, before sieving.
Figure 5:
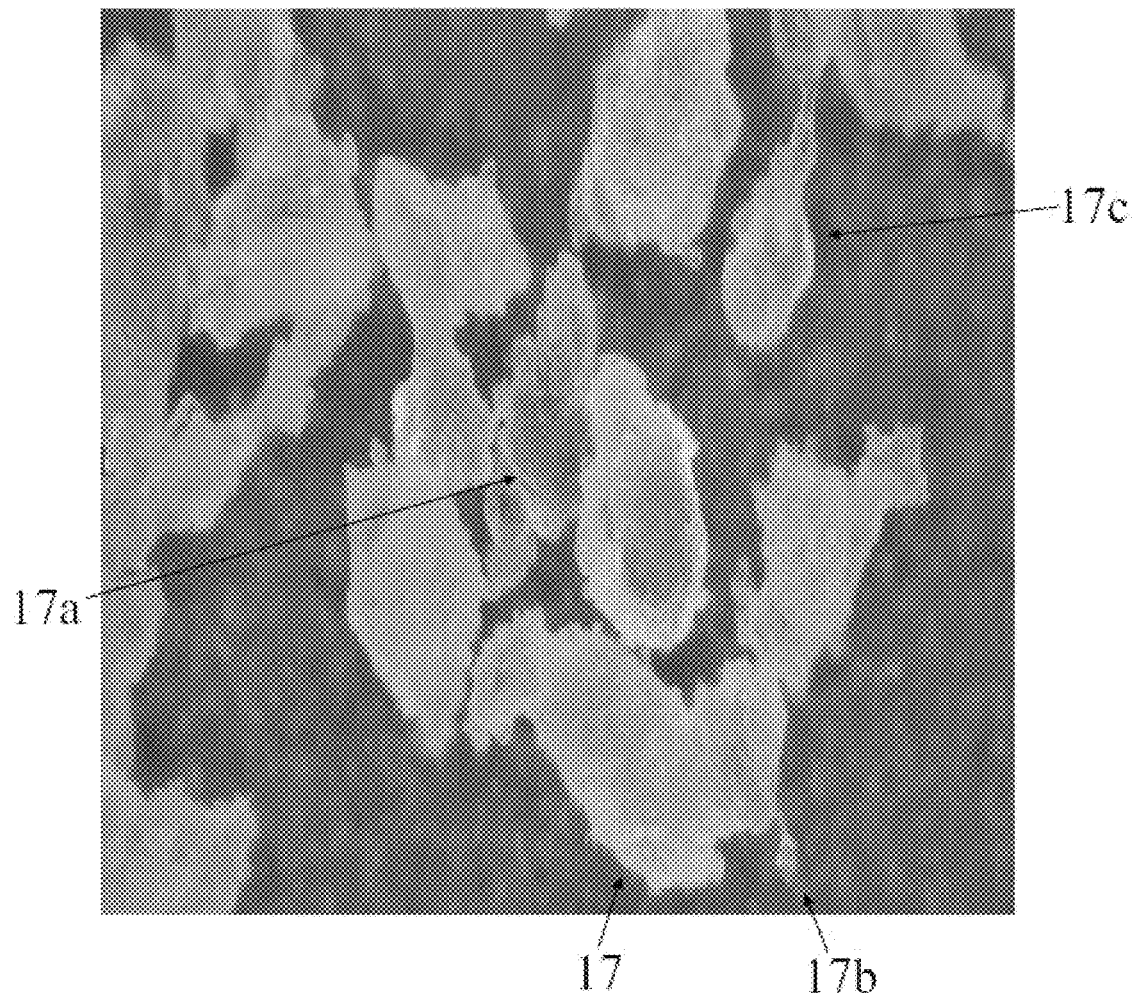
FIG. 5 is a micrograph illustrating pulverized normal microbeads.
Figure 6:
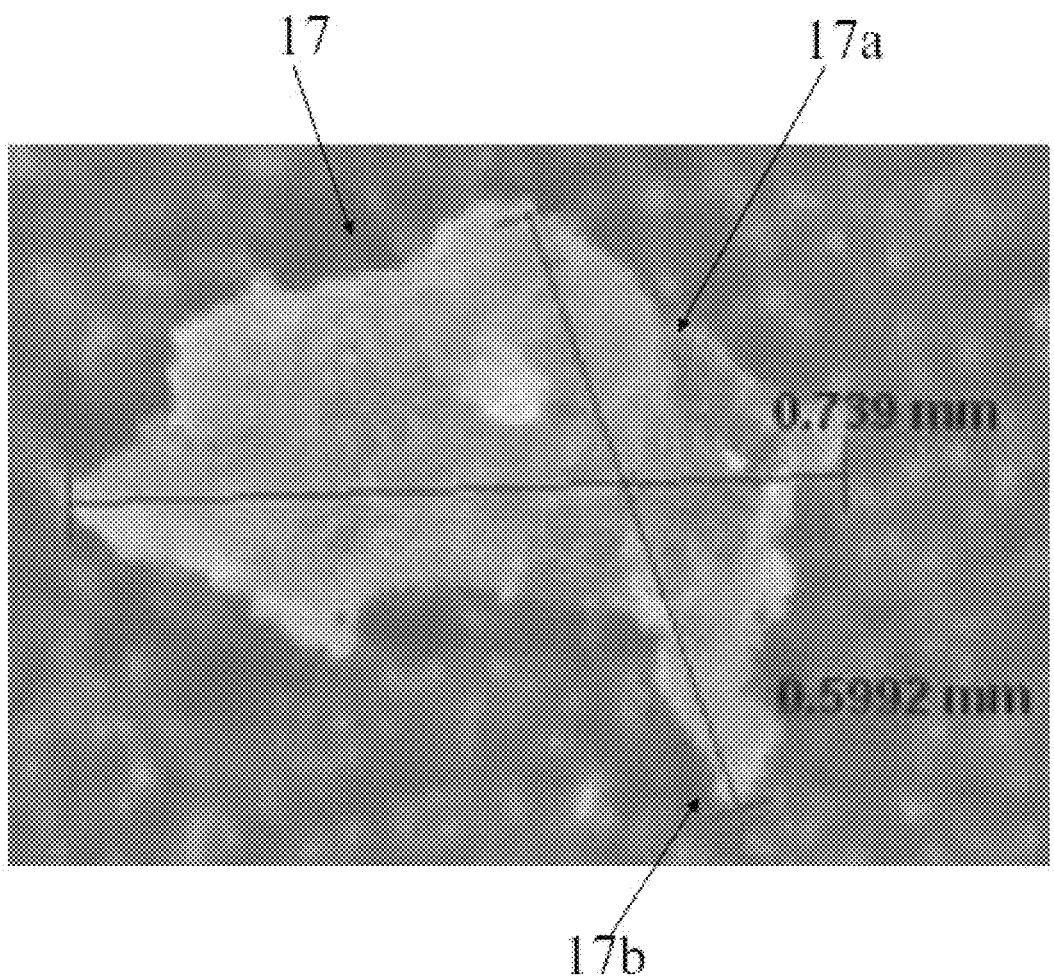
FIG. 6 is a micrograph illustrating the size of pulverized microbeads.

The preferable microbeads have a particle size of 500~600 μm with a spherical shape. The microbeads pulverized by a disk mill have various and irregular shapes as in the micrograph of FIG. 4. Even when the microbeads pulverized by a disk mill are sieved to 40~50 mesh and sorted as normal microbeads, as illustrated in FIG. 5, the microbeads 17 may include cracks 17a, and also deformed portions such as a tail portion 17b or a lump portion 17c. The irregular and deformed portions, especially the tail portion 17b or the lump portion 17c, which is not attached to the film, may be removed from the film after use of the base film 11 having the microbeads 17 attached thereto as the glass protective film for a glass plate.

The microbeads obtained by pulverizing a low-density resin (LDPE) by means of a disk mill are disadvantageous because the yield of normal microbeads is very low.

The low-density resin is pulverized by a disk mill to prepare a polymer powder including normal microbeads, and the processing capability of such microbeads is evaluated.

Figure 7:
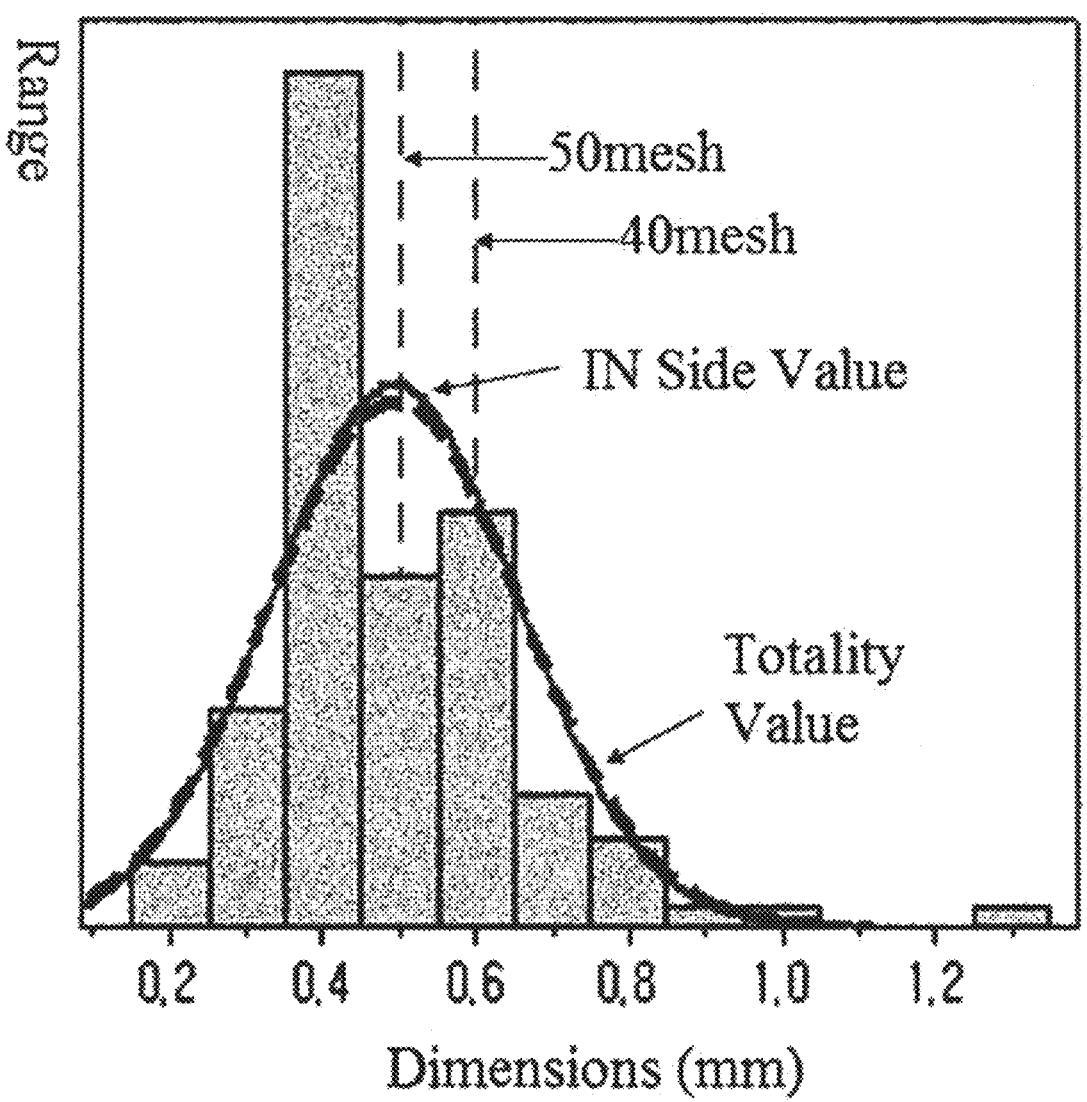
FIG. 7 is a graph illustrating the processing capability of the microbeads pulverized by a disk mill.

FIG. 7 illustrates the particle size distribution of a polymer powder using a particle size analyzer, the polymer powder being obtained by a disk mill the 'inside value' and the 'totality value' of which are set to manufacture microbeads having a particle size of about 500 μm. The polymer powder has a wide particle size distribution ranging from 100 μm to 1300 μm, where the percentage of the most distributed particles is about 38 wt %. Even when a polymer powder is prepared by inducing the particles corresponding to the above percentage to be in the size range of 40~50 mesh, the yield of normal polymer microbeads by a disk mill is only 30 wt %.

In another embodiment, the yield of normal microbeads using a disk mill is only about 20 wt % or 16 wt %.

The microbeads for forming the rough bead surface of a glass protective film may include beads having a maximum particle size of less than 1000 μm, and the preferable particle size thereof is about 50~500 μm. When a powder comprising microbeads in a wide particle size of 50~500 μm is used for the glass protective film, the yield of microbeads by a disk mill may increase but a height variation of the beads attached to the base film may also increase, and thus the ceiling reach rate of the microbeads is remarkably lowered, undesirably remarkably deteriorating non-adhesive performance of the glass protective film. Further, even when the low-density polymer is pulverized using a disk mill and sorted to a particle size of 450~550 μm, it is difficult to completely separate fine particles. Hence, limitations are imposed on improving the ceiling reach rate of the beads of the rough bead surface of the glass protective film.

With the goal of solving such problems, a glass protective film is proposed, which is manufactured by cutting the polymer film having a thickness of 550 μm or less so as to have a regular shape with a predetermined size in the particle size range of 200~600 μm, thus obtaining regular microbeads, which are then attached in an amount of about 7 g/m² to the base film.

When the film having a predetermined thickness is cut by use of a cutter to thus make the cut regular microbeads, the size of the microbeads may fall in the preferable bead size range, thus increasing the yield of normal beads. Also, as the size variation of the beads may decrease, the ceiling reach rate of the beads of the rough bead surface of the glass protective film may increase, thereby improving the non-adhesive performance of the glass protective film and decreasing the risk of mixing of fine particles, ultimately reducing the generation of defects in LCD processes.

The thickness of the film for the cut microbeads is preferably set to 150~550 μm.

The low-density film for the cut microbeads may include a low-density polyethylene-based polymer film; a polyolefin-based polymer film; an olefin-based monomer film such as EVA, EAA or EMMA; a copolymer film having a polar monomer; a polyolefin-based rubber film; and other rubber films.

The high-density polymer film for the cut microbeads may include a polyethylene film, a polypropylene film, a polymethacrylate film, a polystyrene (PS) film, an acrylonitrile-butadiene-styrene (ABS) copolymer film, a HIPS (High Impact Polystyrene) film; a copolymer film containing a styrene monomer, a polyester film, a polyester elastomer film, a nylon elastomer film, a polyester-based polymer film; and a nylon-based polymer film.

Figure 8:
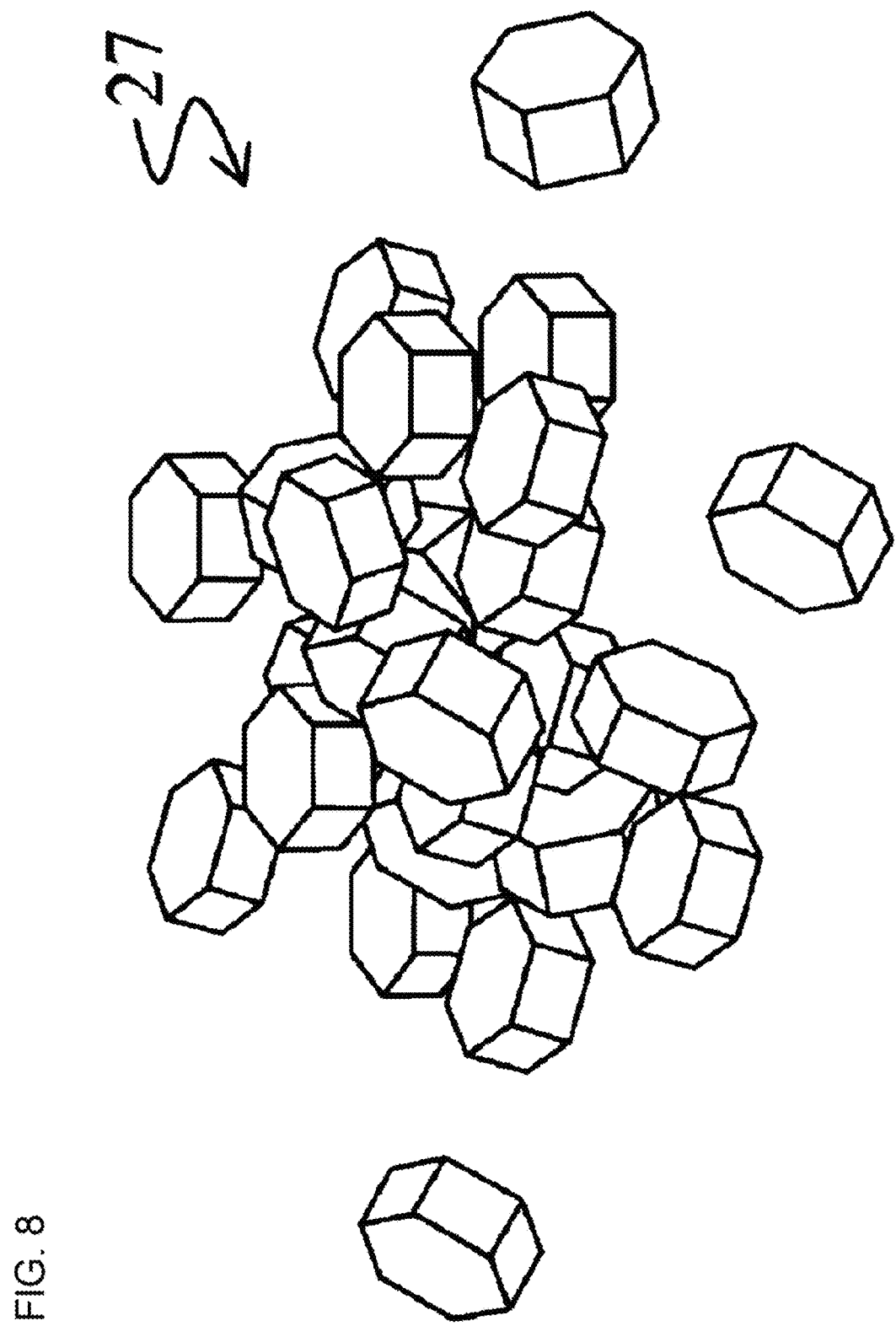
FIG. 8 is an enlarged perspective view illustrating hexagonal microbeads.
Figure 9:
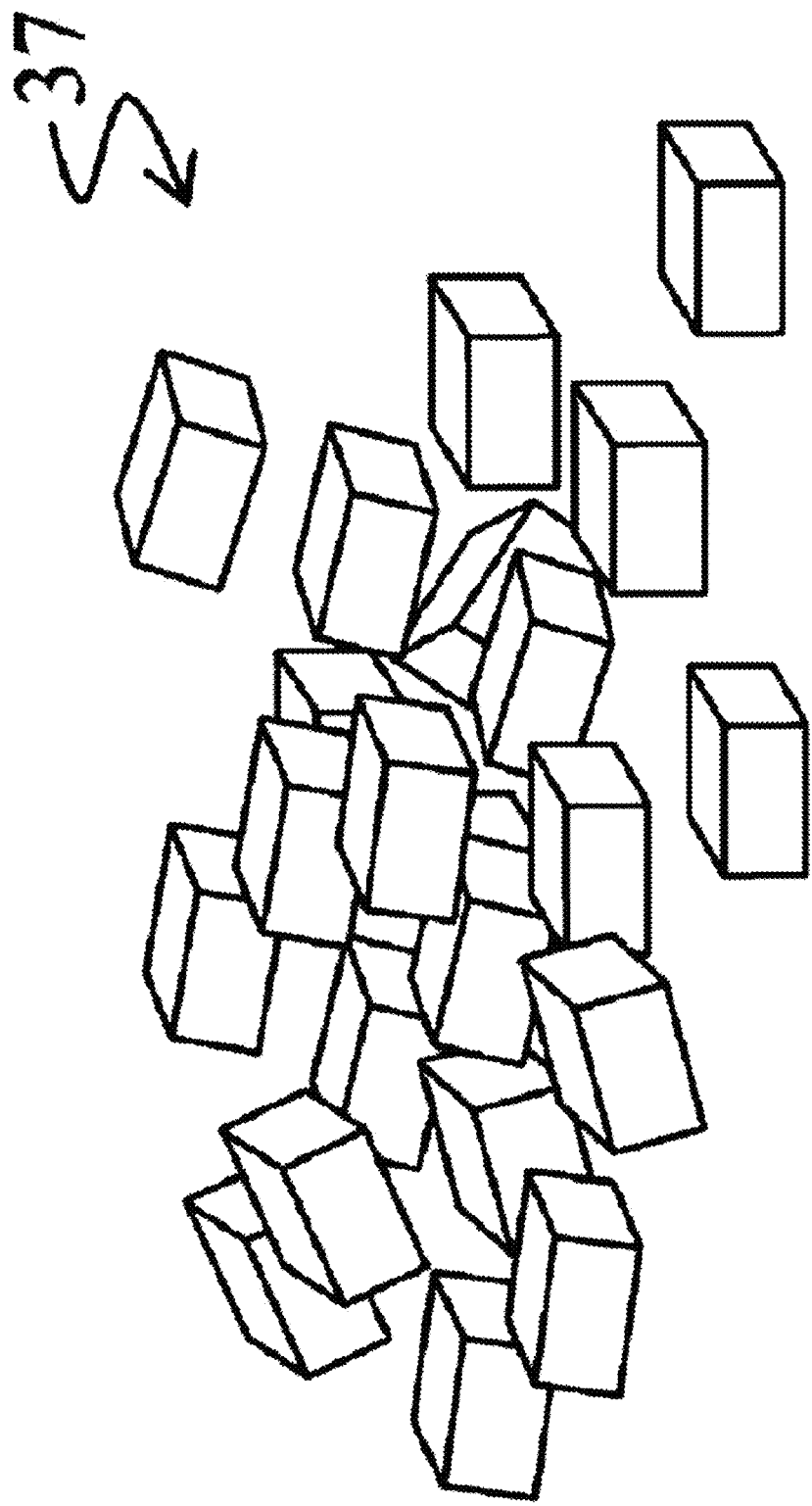
FIG. 9 is an enlarged perspective view illustrating rectangular microbeads.
Figure 10:
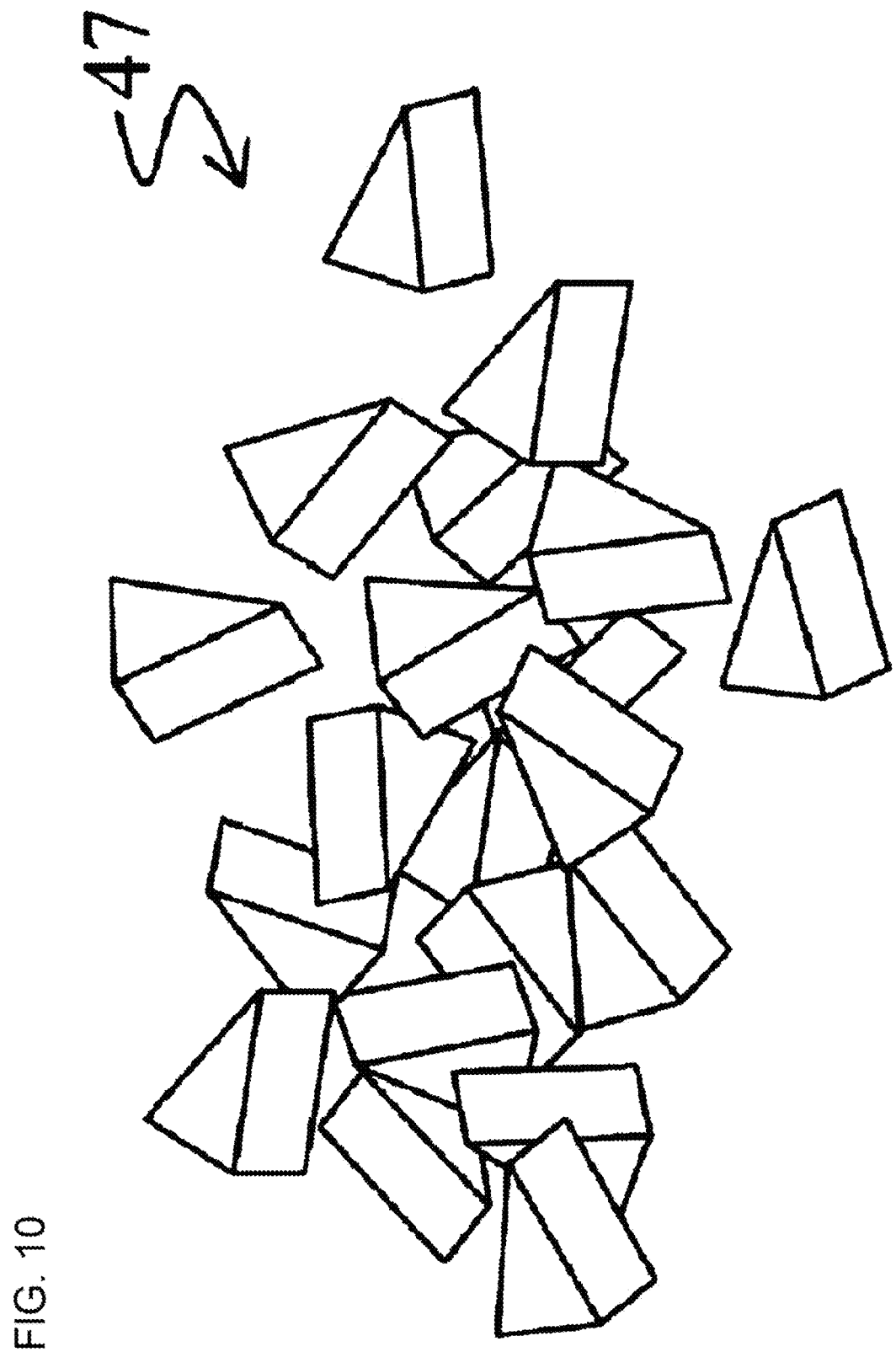
FIG. 10 is an enlarged perspective view illustrating triangular microbeads.

Although the shape of the cut regular microbeads is not particularly limited, particularly useful are microbeads which facilitate the construction of a cutter for cutting a two-dimensional planar film without film debris. The microbeads which facilitate the construction of a cutter without the film debris may include hexagonal beads 27 as illustrated in FIG. 8, rectangular beads 37 as illustrated in FIG. 9, and triangular beads 47 as illustrated in FIG. 10.

The hexagonal beads 27 have a honeycombed planar configuration and may be cut without the film debris. The cut hexagonal plate shape is closer to a circular shape, and is thus the preferable shape of the microbeads. The honeycombed cutting is performed by cutting the film material while laterally moving it in a honeycombed pattern in a cutting cycle under the condition that the position of a rotary cutter is fixed.

Figure 11:
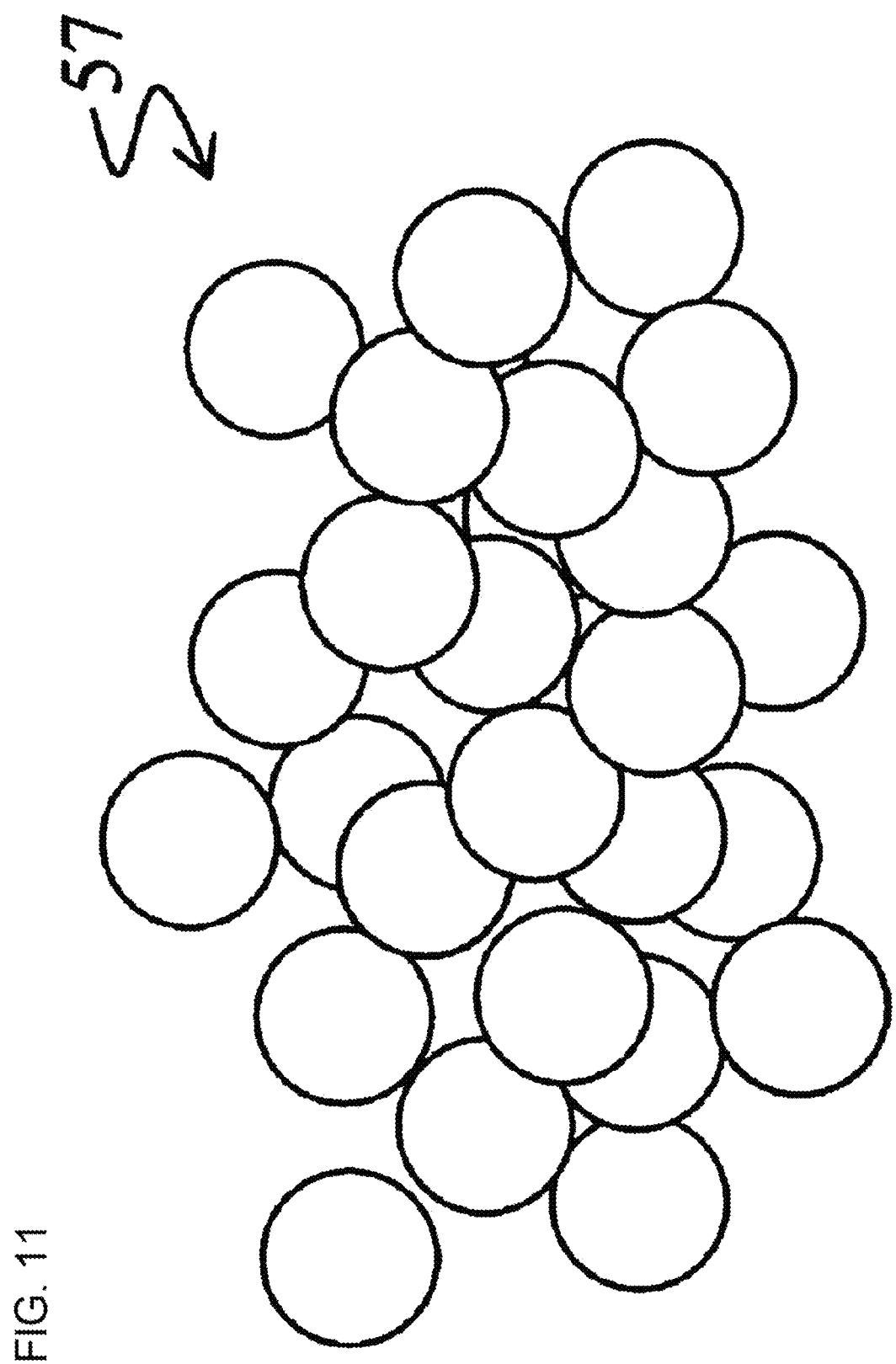
FIG. 11 is an enlarged perspective view illustrating ball microbeads.

When not considering economic efficiency, the ball beads 57 illustrated in FIG. 11, like the cut microbeads, may be attached to the non-adhesive surface as the second surface of the glass protective film to make a rough bead surface.

The ball beads 57 may be manufactured by melting polymer units thus obtaining polymer particles, to which surface tension is then applied to form spherical ball beads, or by grinding the cured polymer particles.

Figure 12:
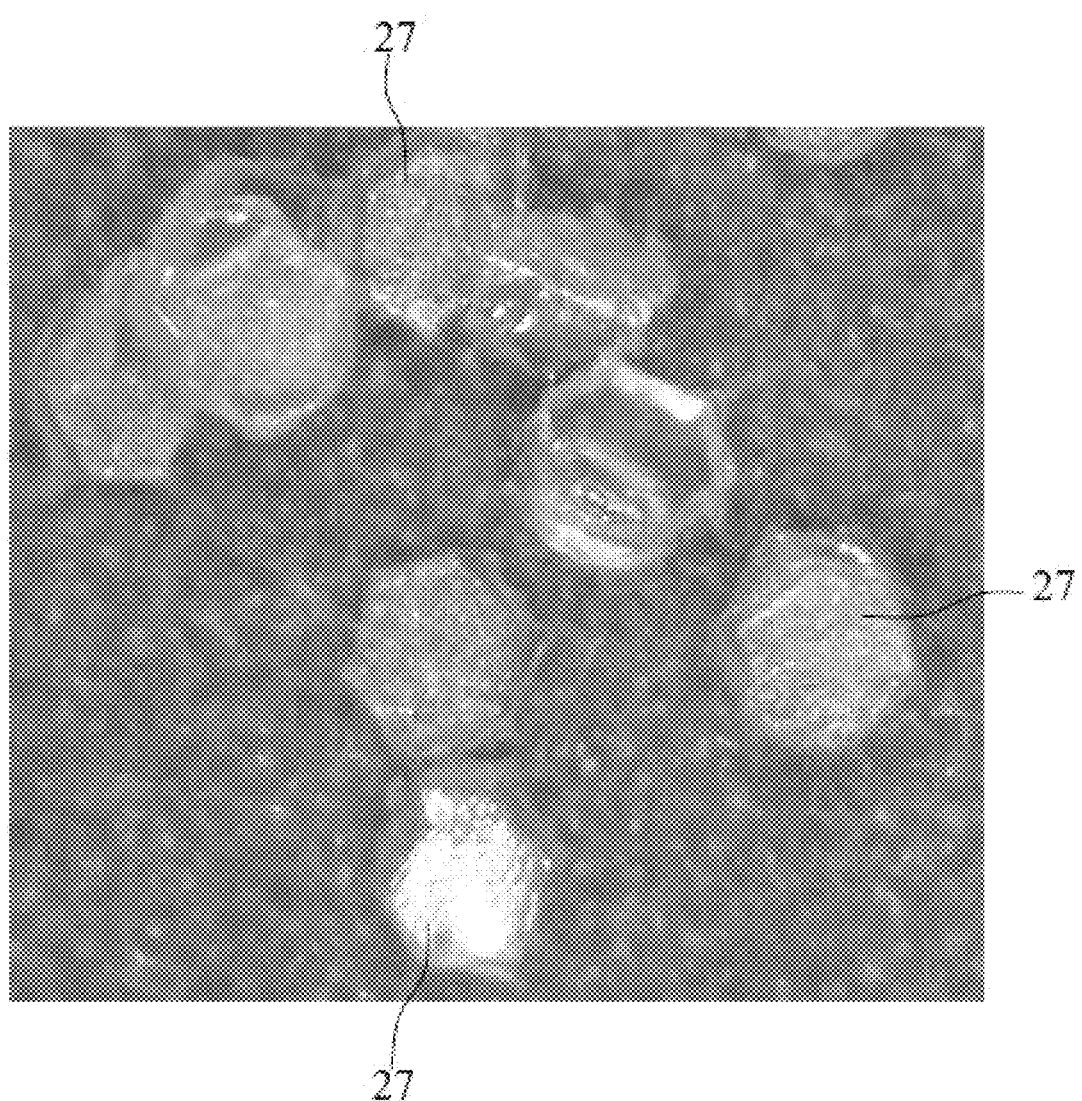
FIG. 12 is a micrograph illustrating cut hexagonal microbeads.

FIG. 12 is a micrograph illustrating a cut powder (microbeads) obtained by cutting a polymer film having a thickness of 250 μm into a hexagonal shape using a cutter having a hexagon diameter of 500 μm.

Figure 13:
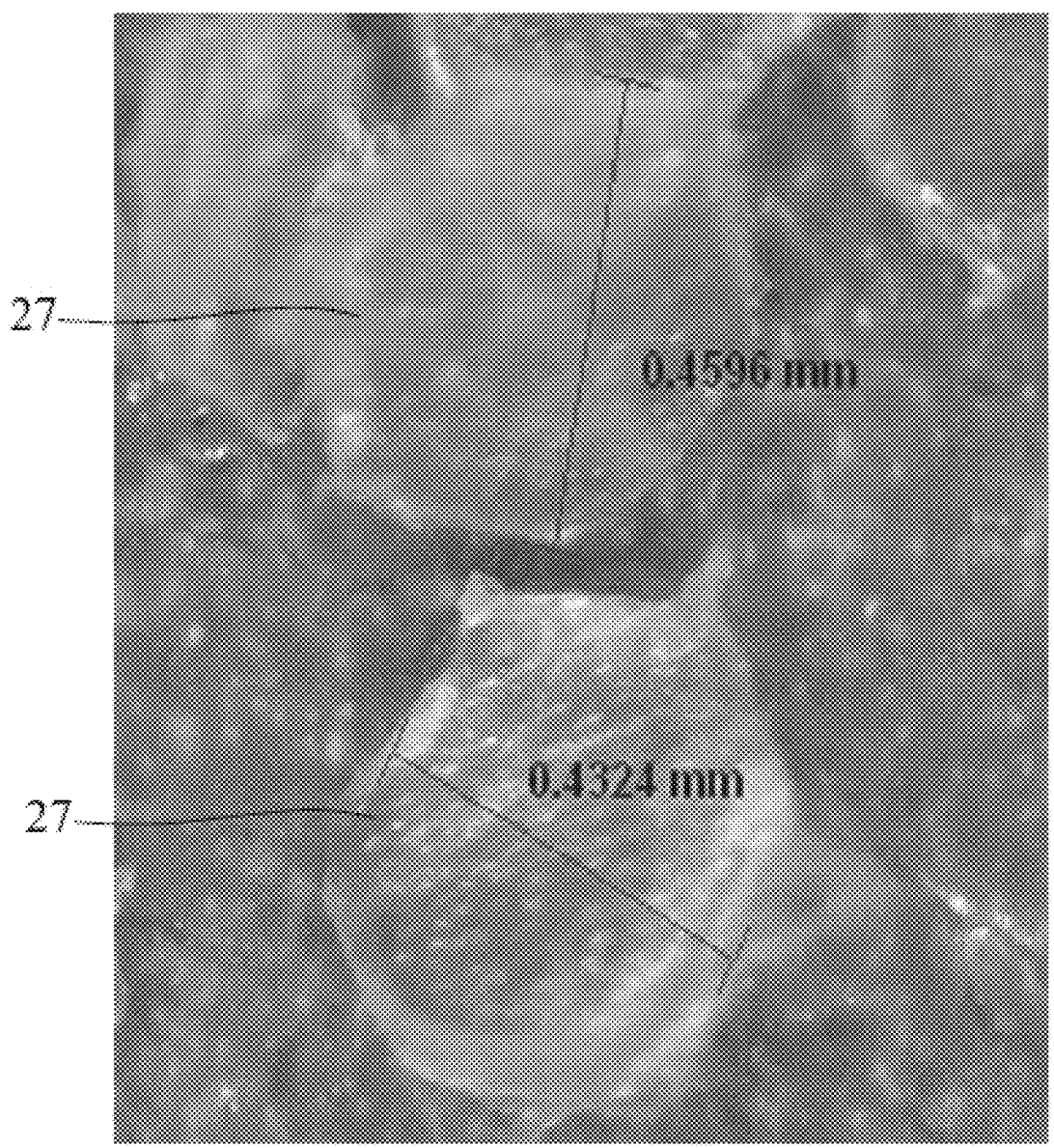
FIG. 13 is a micrograph illustrating the size of cut hexagonal microbeads.

FIG. 13 is a micrograph illustrating the measured size of the cut hexagonal microbeads 27 obtained by cutting a polymer film having a thickness of 250 μm into a hexagonal shape using a cutter having a hexagon diameter of 500 μm. The diameters of the parallel zones of the microbeads 27 are measured to be 0.459 mm and 0.4324 mm. Thus, the polymer microbeads having a hexagon diameter of about 500 μm can be seen to be obtained.

Figure 14:
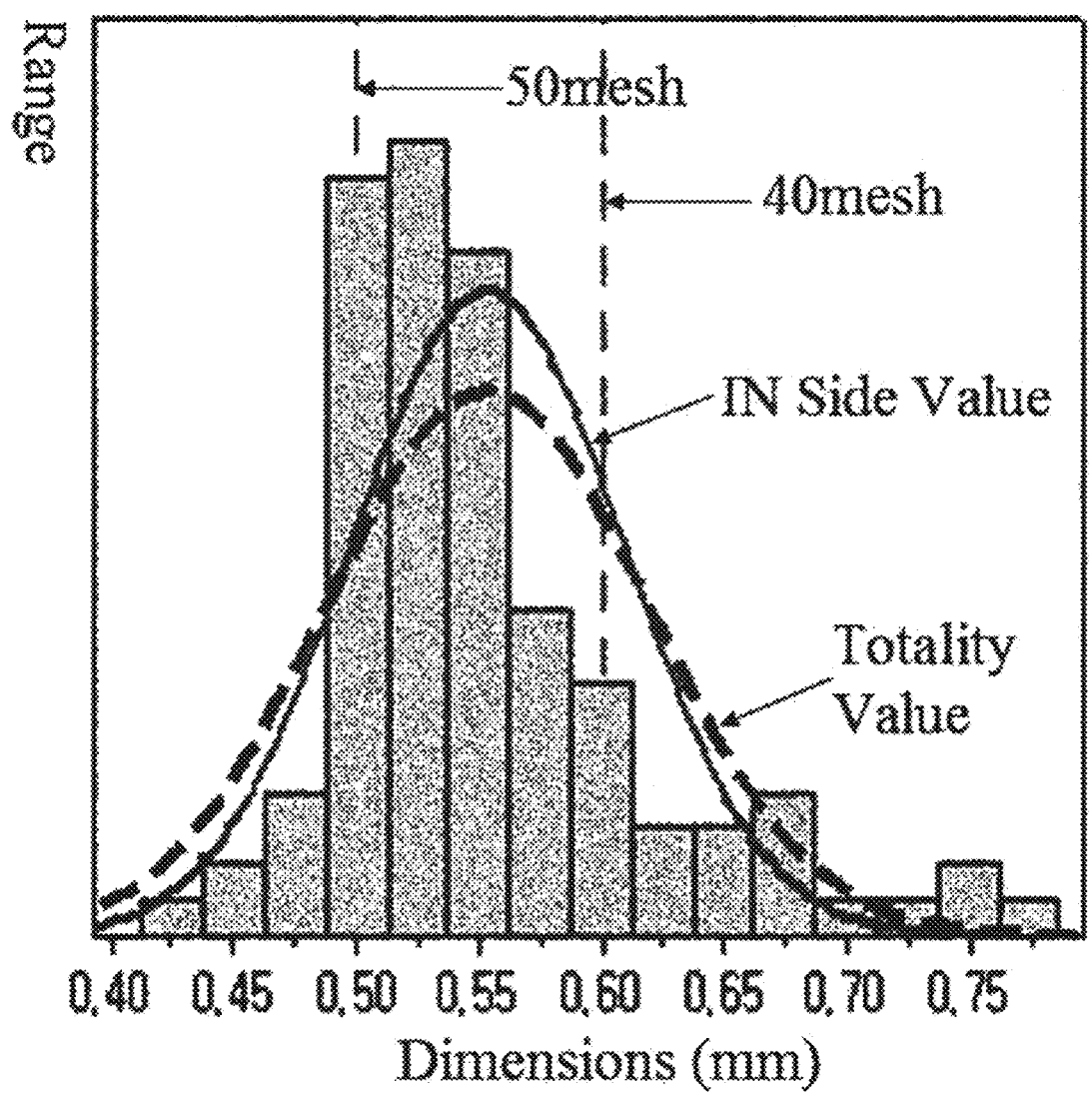
FIG. 14 is a graph illustrating the processing capability of the cut hexagonal microbeads.

FIG. 14 is a graph illustrating the particle size distribution of a cut powder (microbeads) using a particle size analyzer, the cut microbeads being obtained by cutting a polymer film having a thickness of 250 μm into a hexagonal shape using a cutter having a hexagon diameter of 500 μm. In the graph, 40 mesh and 50 mesh are used to compare the size of the microbeads pulverized by a disk mill. Also, the inside value and the totality value are used to compare the particle size distribution of the pulverized microbeads. The bar heights in the graph show the size distribution of hexagonal microbeads. The cut hexagonal microbeads have a particle size of about 0.42~0.77 mm with narrow variation, and may be mainly distributed in the particle size range of 0.48~0.62 mm favorable for forming a rough bead surface.

Figure 15:
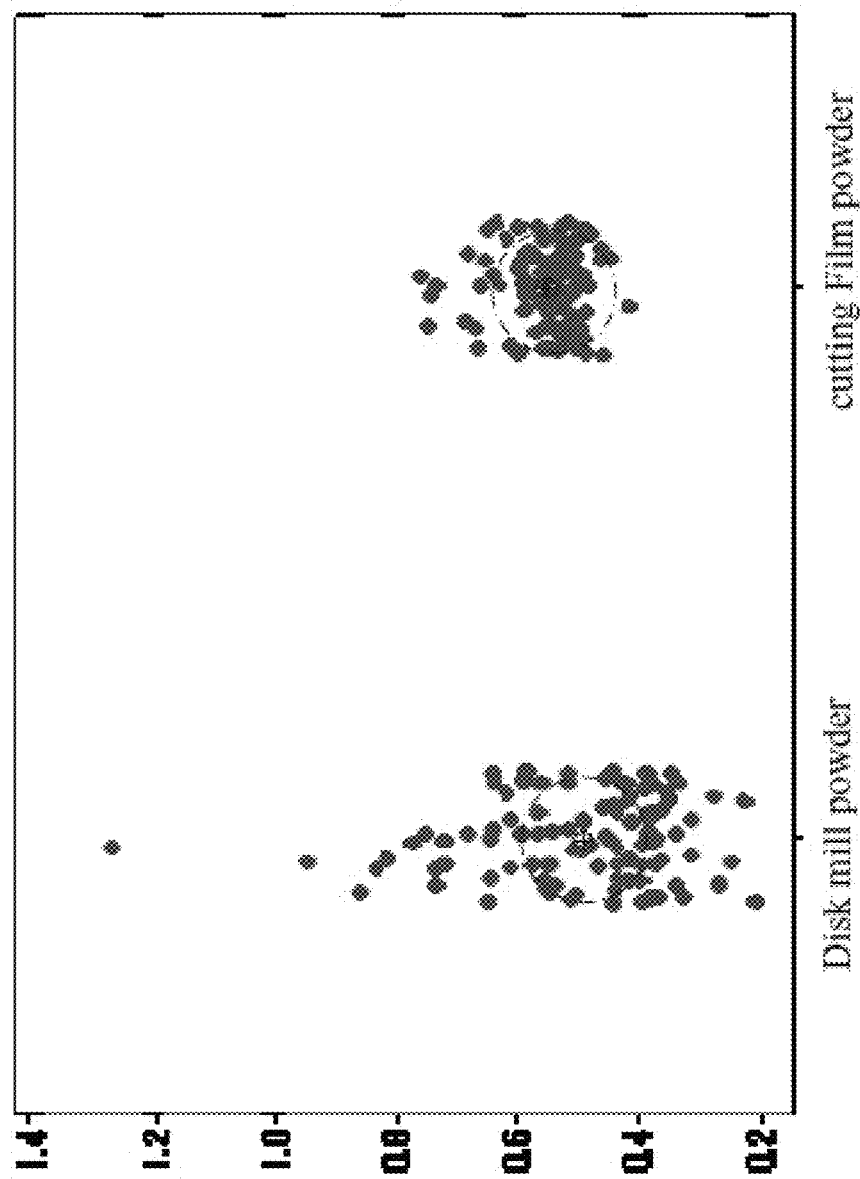
FIG. 15 is a view illustrating the size distribution of a powder pulverized by a disk mill and a powder formed by cutting a film.

FIG. 15 is a graph illustrating the size distribution of the pulverized microbeads 17 corresponding to a disk mill powder and the hexagonal microbeads 27 corresponding to a cut film powder. The overlapping circular range of each distribution point represents the most preferable particle size distribution.

FIG. 16 illustrates a device for dropping and adhering the cut microbeads onto the base film.

Specifically, a weak adhesive polymer is melted by an extruder 101, and then formed into a film 11m by a die 102. The formed film is cooled and cured while passing through a pair of cooling rolls 104, 105 and then wound on a roll 106. In the apparatus for forming a film, a bead feeder 103 is disposed over the cooling rubber roll 105 and a dropping distance G is given between the bead feeder 103 and the cooling rubber roll 105. The dropping distance G enables the cut microbeads to be appropriately distributed while passing through the air when being seated onto the cooling rubber roll 105 from the bead feeder 103. The pair of cooling rolls may include the cooling roll 104 for forming a mirror surface that is the weak adhesive surface 12 on the first surface of the base film 11, and the cooling rubber roll 105 for transporting the microbeads so as to be attached to the second surface of the base film 11. As the cooling rolls 104, 105 rotate while cooling the formed film, the cut microbeads (or ball beads) distributed and seated on the cooling rubber roll 105 are transferred without changing the distributed state thereof to the second surface of the film 11m to be cooled, and are then attached to the second surface of the base film 11 during the cooling of the film, thus obtaining a rough bead surface 13 having a regular size and shape of the microbeads. When the film formed of the weak adhesive polymer passes through the pair of cooling rolls in this way, the first surface of the base film 11 becomes a weak adhesive surface 12 as the mirror surface and the second surface thereof becomes a rough bead surface 13 onto which the microbeads are distributed and adhered.

In the apparatus of FIG. 16, the regular microbeads used to manufacture the glass protective film may be cut beads, such as hexagonal beads 27, rectangular beads 37 or triangular beads 47, ball beads 57, or beads having other shapes.

Figure 17:
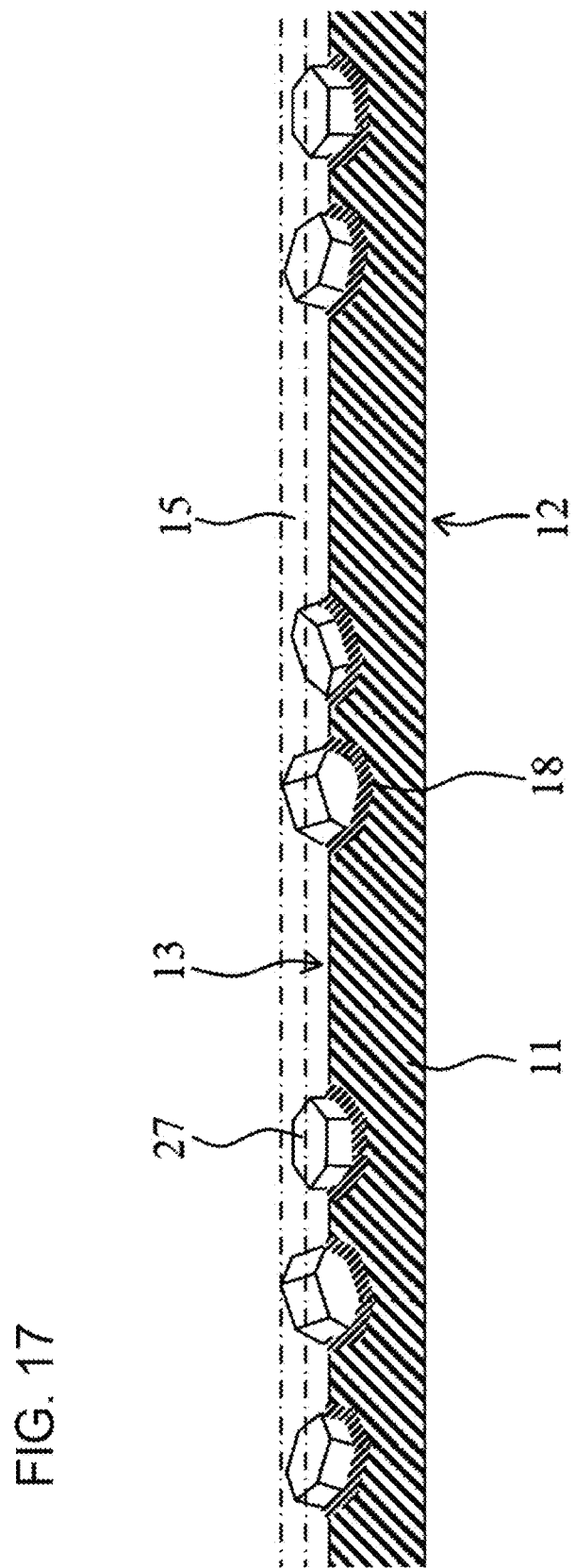
FIG. 17 is an enlarged cross-sectional view illustrating a glass protective film having cut hexagonal beads attached thereto.

FIG. 17 is an enlarged cross-sectional view illustrating a film having a rough bead surface formed by the hexagonal beads 27 resulting from cutting a film. The hexagonal beads 27 are attached to the second surface of the base film 11, thus manufacturing the film having a rough bead surface. Further, an adhesive portion 18 is formed between the hexagonal beads 27 and the base film 11. The hexagonal beads 27 have height variations but have almost the same size, and thus all of them belong in the ceiling region 15.

Figure 18:
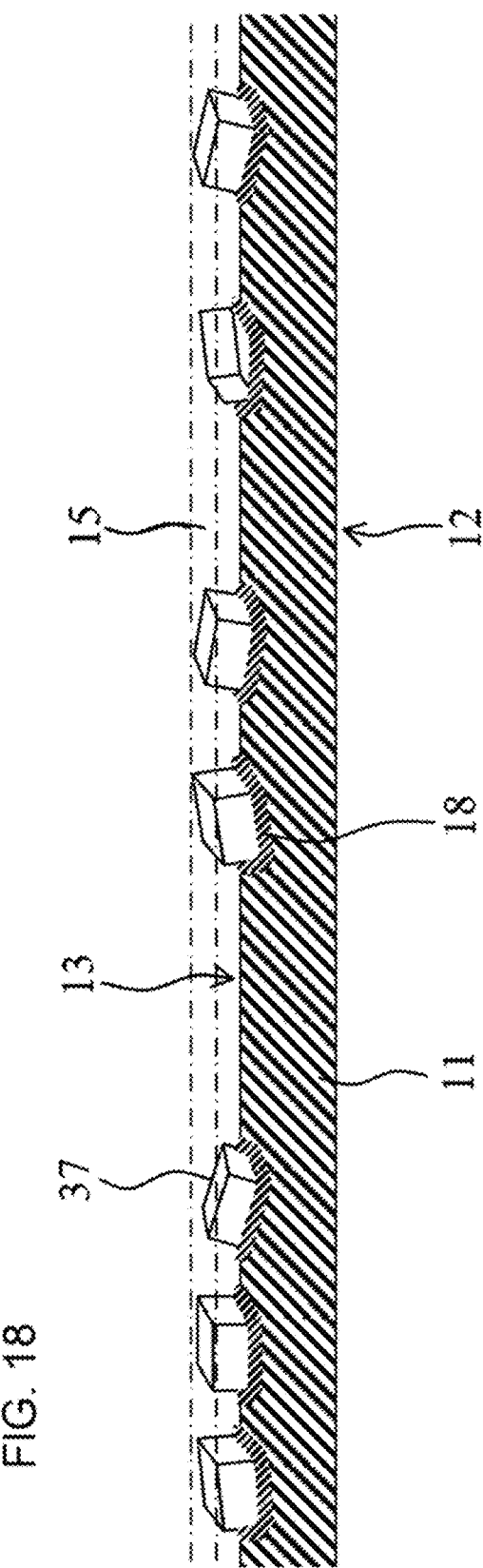
FIG. 18 is an enlarged cross-sectional view illustrating a glass protective film having cut rectangular beads attached thereto.

FIG. 18 is an enlarged cross-sectional view illustrating a film having a rough bead surface formed by the rectangular beads 37 resulting from cutting a film. The rectangular beads 37 are attached to the second surface of the base film 11, thus manufacturing the film having a rough bead surface. Further, an adhesive portion 18 is formed between the rectangular beads 37 and the base film 11. The rectangular beads 37 have height variations but have almost the same size, and thus all of them belong in the ceiling region 15.

Figure 19:
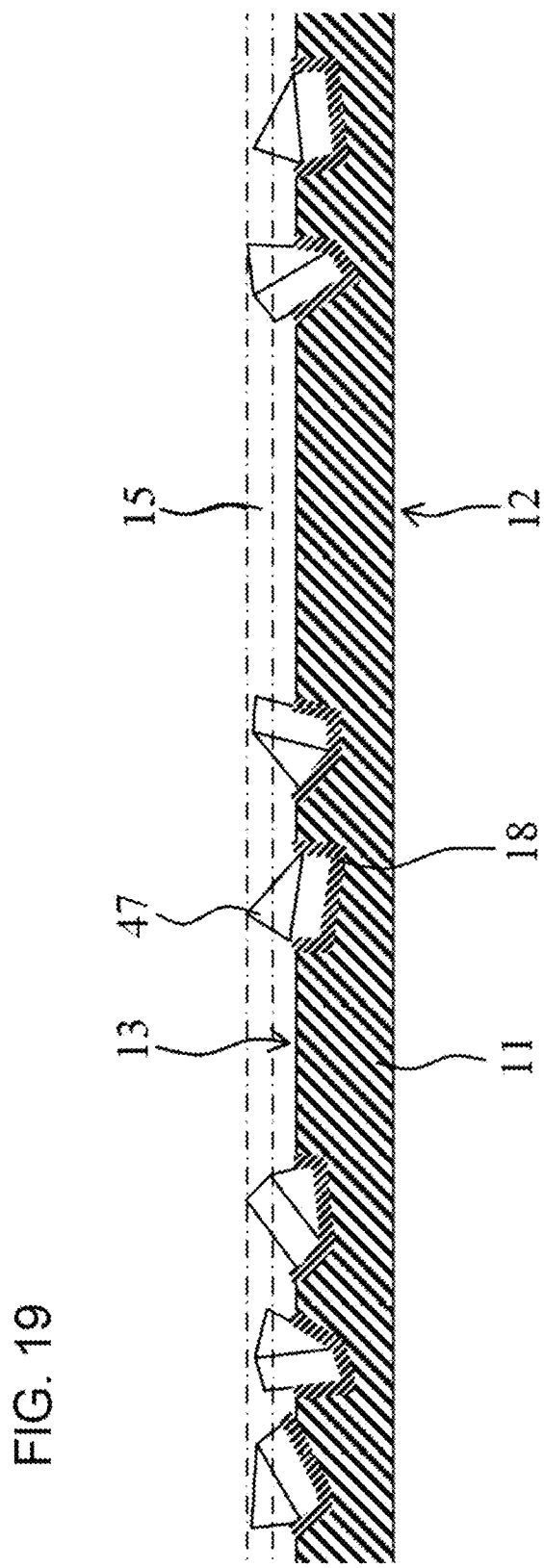
FIG. 19 is an enlarged cross-sectional view illustrating a glass protective film having cut triangular beads attached thereto.

FIG. 19 is an enlarged cross-sectional view illustrating a film having a rough bead surface formed by the triangular beads 47 resulting from cutting a film. The triangular beads 47 are attached to the second surface of the base film 11, thus manufacturing the film having a rough bead surface. Further, an adhesive portion 18 is formed between the triangular beads 47 and the base film 11. The triangular beads 47 have height variations but have almost the same size, and thus all of them belong in the ceiling region 15.

Figure 20:
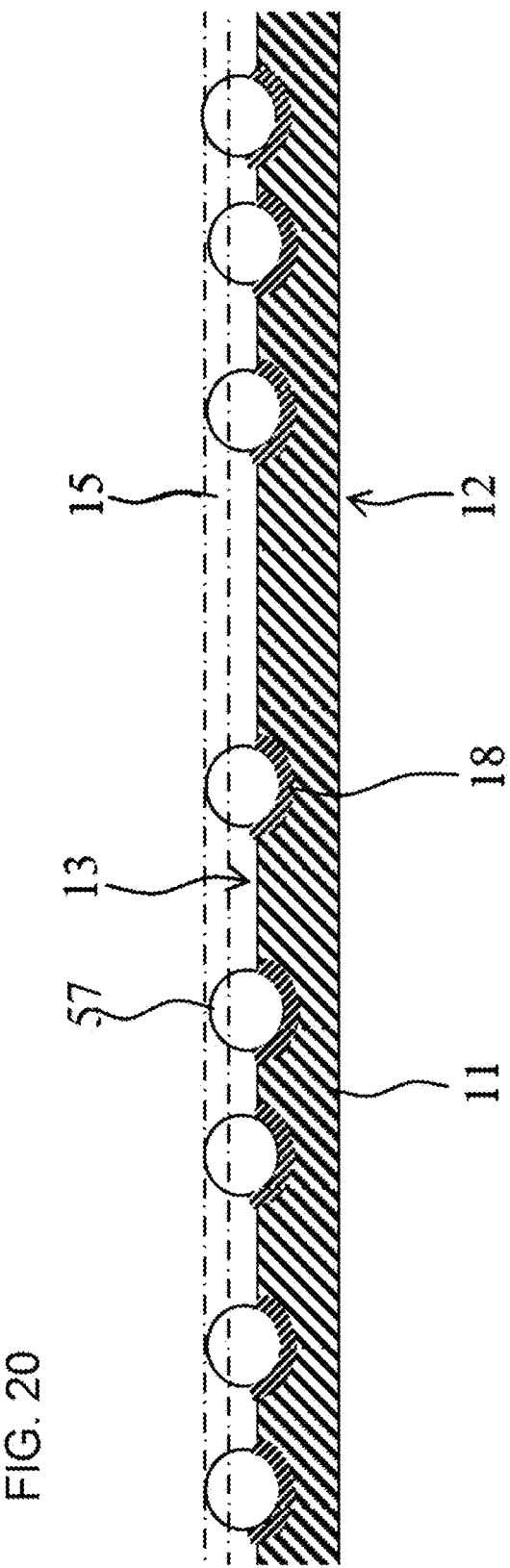
FIG. 20 is an enlarged cross-sectional view illustrating a glass protective film having ball beads attached thereto.

FIG. 20 is an enlarged cross-sectional view illustrating a film having a rough bead surface formed by the ball beads 57. The ball beads 57 are attached to the second surface of the base film 11, thus manufacturing the film having a rough bead surface. Further, an adhesive portion 18 is formed between the ball beads 57 and the base film 11. The ball beads 57 have height variations but have almost the same size, and thus all of them belong in the ceiling region 15.

The cut microbeads prepared by cutting a film produce no fine powder in the course of preparation thereof, and the yield of normal microbeads is high, thus generating economic benefits.

The glass protective film having a rough bead surface formed by the cut microbeads is greatly enhanced in non-adhesiveness thereof because the ceiling reach rate of the beads of the rough bead surface approximates 100%, resulting in an increased separation speed of the glass plates one by one.

VARIOUS EXAMPLES FOR EMBODIMENTS OF THE INVENTION

Example 1

Preparation Example of Glass Protective Film Using Hexagonal Beads

Cut microbeads: Hexagonal beads
Film for cutting beads: Low-density polyethylene film with a thickness of 250 μm
Particle size of beads: 450~500 μm
Melting temperature of beads: 140° C.
Weight of base film: 10 g/m$^2$
Use condition: Clean room
Diameter of cooling rubber roll: 80 cm
Line speed: 90 m/min
Amount (volume) of attached beads: 5 g/m$^2$
Diameter of hexagonal bead-releasing holes arranged on bottom of hopper as bead feeder: 1.5 mm
Interval between hexagonal bead-releasing holes: 2 cm
Shaft for releasing hexagonal beads: Rotary hexagonal bar
Dropping distance (G): 5 cm Example 2

Preparation Example of Glass Protective Film Using Rectangular Beads

Cut microbeads: Rectangular beads
This example was performed in the same manner as in Example 1, with the exception that rectangular beads were used.

Example 3

Preparation Example of Glass Protective Film Using Triangular Beads

Cut microbeads: Triangular beads
This example was performed in the same manner as in Example 1, with the exception that triangular beads were used.

Example 4

The properties of the LCD glass protective films of Examples 1 to 3 are as follows.

i) Adhesion of film: Weak adhesion of a base film was the same as inherent adhesion of a polymer.

ii) Non-adhesive properties of film:

General characteristics: A rough bead surface was formed by adhering the cut regular beads to the second surface of a 10 g/m² thin base film. The rough bead surface formed by the cut beads had a ceiling reach rate as high as 94~100%, and thus, it was confirmed to exhibit excellent non-adhesiveness. Since an air layer was formed on the second surface of the base film by the rough bead surface having a high ceiling reach rate of the beads, separation properties of the stacked glass plates became very good when transporting such glass plates one by one.

iii) General characteristics: The rough bead surface formed by attaching the hexagonal beads to the second surface of the 10 g/m² thin base film did not show any impairment in the course of post recovery treatment after use of the film, in a suction hood. The hexagonal beads protruding from the base film acted as an elastic material between the stacked glass plates, thus increasing transport safety of the glass plates.

Although the present specification may describe components and functions implemented in the embodiments with reference to particular standards and protocols, the disclosure is not limited to such standards and protocols. Each of the standards represent examples of the state of the art. Such standards are from time-to-time superseded by equivalents that may be faster or more efficient, but having essentially the same structures and/or functions.

The illustrations of examples described herein are intended to provide a general understanding of the structure of various embodiments, and they are not intended to serve as a complete description of all the elements and features of devices, apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense. Additionally, unless otherwise specifically expressed or clearly understood from the context of use, a term as used herein describes the singular or the plural of that term.

The terms "a" or "an", as used herein, are defined as one or more than one. The term "plurality", as used herein, is defined as two or more than two. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, commanded, altered, modified, built, composed, constructed, designed, or that has any combination of these characteristics to carry out a given function. The term "adapted to" describes hardware, software or a combination of hardware and software that is capable of, able to accommodate, to make, or that is suitable to carry out a given function.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

The invention claimed is:

1. A glass protective film, comprising:
a base film with an adhesive surface as a first surface thereof and a rough bead surface as a second surface thereof, wherein the rough bead surface of the second surface of the base film comprises polymer film plate microbeads having a thickness, and all having a same regular shape with a size of 200 to 600 µm, selected from any one of the following cut polymer film microbead shapes: hexagonal, rectangular, and triangular, and the polymer film plate microbeads being uniformly distributed with a density of between 0.1 g/m² to 7 g/m² on the rough bead surface.

2. The glass protective film of claim 1, wherein the cut microbeads are obtained by cutting at least one film selected from among a polyethylene film; high-density polyethylene, a polypropylene film, a polymethacrylate film, a polystyrene (PS) film, an acrylonitrile-butadiene-styrene (ABS) copolymer film, a HIPS (High Impact Polystyrene) film; a copolymer film containing a styrene monomer, a polyester film, a polyester elastomer film, a nylon elastomer film, a polyester-based polymer film; and a nylon-based polymer film.

3. The glass protective film of claim 1, wherein the base film comprises a low-density polyethylene.

4. The glass protective film of claim 1, wherein the polymer film plate microbeads have a predetermined hexagonal shape and a particle size range of 420 to 600 μm.

* * * * *